United States Patent
Tran et al.

[11] Patent Number: 6,038,671
[45] Date of Patent: Mar. 14, 2000

[54] POWER MANAGEMENT OF A COMPUTER SYSTEM USING A POWER BUTTON

[75] Inventors: Robin T. Tran, Houston, Tex.; Christopher Simonich, Hillsboro, Oreg.

[73] Assignee: Compaq Computer Corporation, Houston, Tex.

[21] Appl. No.: 09/041,387

[22] Filed: Mar. 12, 1998

[51] Int. Cl.$^7$ .................................................. G06F 1/26
[52] U.S. Cl. ............................................ 713/300; 714/24
[58] Field of Search .................................. 713/300, 323, 713/324; 714/23, 24

[56] References Cited

U.S. PATENT DOCUMENTS 5,495,569   2/1996   Kotzur.
5,627,867   5/1997   Thomson.
5,627,962   5/1997   Goodrum et al..
5,918,059   6/1999   Tavallaei et al. ....................... 713/300

*Primary Examiner*—Glenn A. Auve
*Attorney, Agent, or Firm*—Sharpe, Comfort & Merrett, P.C.

[57] ABSTRACT

When a computer system's power button is depressed a timer is begun, an operating system visible status flag is set, and an interrupt is sent to the operating system indicating power button activation. If the operating system does not clear the flag within a specified time period, the computer system is considered to be in an error (e.g., "hung" state) and the computer system is powered down.

38 Claims, 4 Drawing Sheets

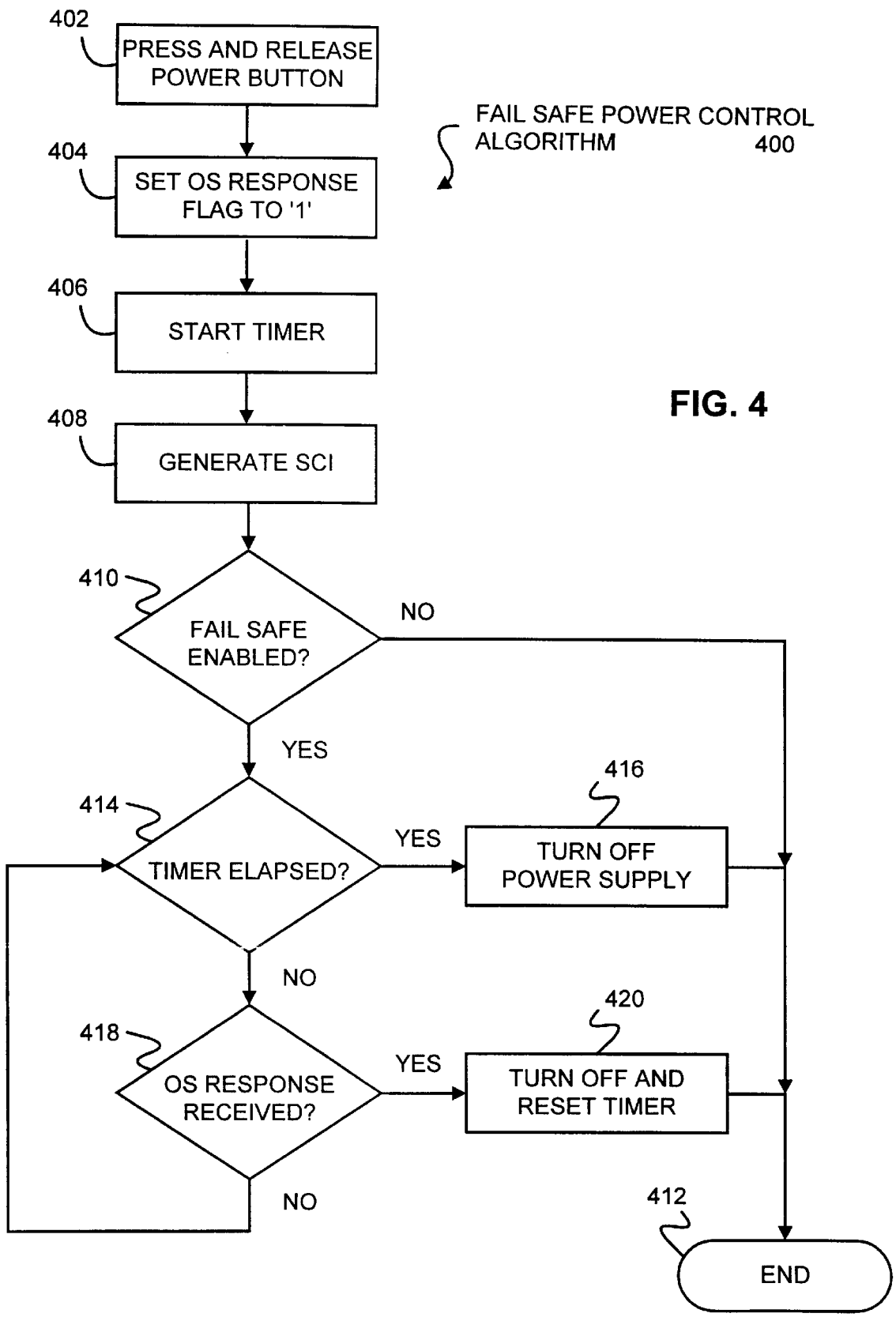

POWER MANAGEMENT OF A COMPUTER SYSTEM USING A POWER BUTTON

BACKGROUND

The invention relates to power management of an advanced configuration and power interface (ACPI) computer system.

Known power management techniques, such as the advanced power management (APM) algorithm, were implemented by basic input-output system (BIOS) instructions stored in read-only memory (ROM). When a power management or configuration event occurred (e.g., a request to transition from an "on" state to a "sleep" state), the BIOS received notice of the event via an operating system transparent interrupt known as a system management interrupt (SMI). It was the responsibility of the BIOS to manipulate the necessary software state information and to control the necessary hardware to perform the requested action.

Under the new ACPI, when a power management or configuration event occurs the operating system is notified via an operating system visible interrupt known as a system control interrupt (SCI). It is the operating system itself that directs all system and device power state transitions. Central to ACPI operations is an ACPI driver. This driver is an operating system level program which receives notice of all SCI events and either performs the necessary event handling actions itself, or passes control to an ACPI control method.

The ACPI specification represents an abstract interface between a computer system's hardware and firmware and its operating system. The ACPI includes a set of hardware registers, tables, and BIOS. ACPI registers are used to store and pass event information between the hardware/firmware and operating system. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake, some restart operations, and provides permanent storage of ACPI table information.

In accordance with the ACPI specification, when a user activates a computer system's power button a SCI is transmitted to the operating system (the ACPI driver). As stated previously, it is the operating system's task to transition the system into the appropriate state: working (system dispatches and executes user code); soft-off (system consumes minimal amount of power, no user code is executed); or mechanical off (equivalent to unplugging the system's power cable).

When an ACPI computer system is "hung" (i.e., in the working state but failing to dispatch and/or execute code) and the user activates the system power button, the generated SCI cannot be processed because instructions are not being executed. Thus, when hung, momentarily pressing the power button will not transition the system into either the sleep or off state. To partially compensate for this situation, ACPI requires that hardware transition the system from the working state to the soft-off state when the power button is pressed and held for at least four seconds.

SUMMARY

In one aspect, the invention features a computer system having a host processor, a power button, and a control circuit. The control circuit is connected to the power button to detect when it has been activated. The control circuit is also connected to the host processor to detect when it is in a hung state (a state in which the processor cannot respond to activation of the power button). The control circuit is configured to change the power state of the computer system a specified time period after the power button has been activated when the processor is in a hung state. Detection of power button activation, processor state, and processor state changes occur independently of other computer system activity.

In some embodiments, the control circuit includes a status flag and timer. The status flag can be set on power button activation and cleared by an operating system in response to the power button activation. Control circuit elements may be designed using discrete logic components such as flip-flops and timers, or included in an application specific integrated circuit, or a combination of these methodologies. The computer system can include additional elements such as input-output devices such as a pointing device(s), a mass storage device(s), and a keyboard.

In another aspect, the control circuit may be in a form that can be connected to an existing computer system. For example, an application specific integrated circuit element, or a printed circuit board, adapted to connect to a bus of the computer system.

In yet another aspect, the invention provides a method to control the power state of a computer system having a host processor and power button. When the method receives indication that the power button has been activated, a flag is set, a timer is started, and an interrupt is sent to the host processor. If the timer expires before the host processor clears the flag, the power state of the computer system is changed. In one embodiment the interrupt is a system control interrupt.

BRIEF DESCRIPTION OF THE DRAWINGS

FIG. 4 shows power control operations.

DETAILED DESCRIPTION

Figure 1:
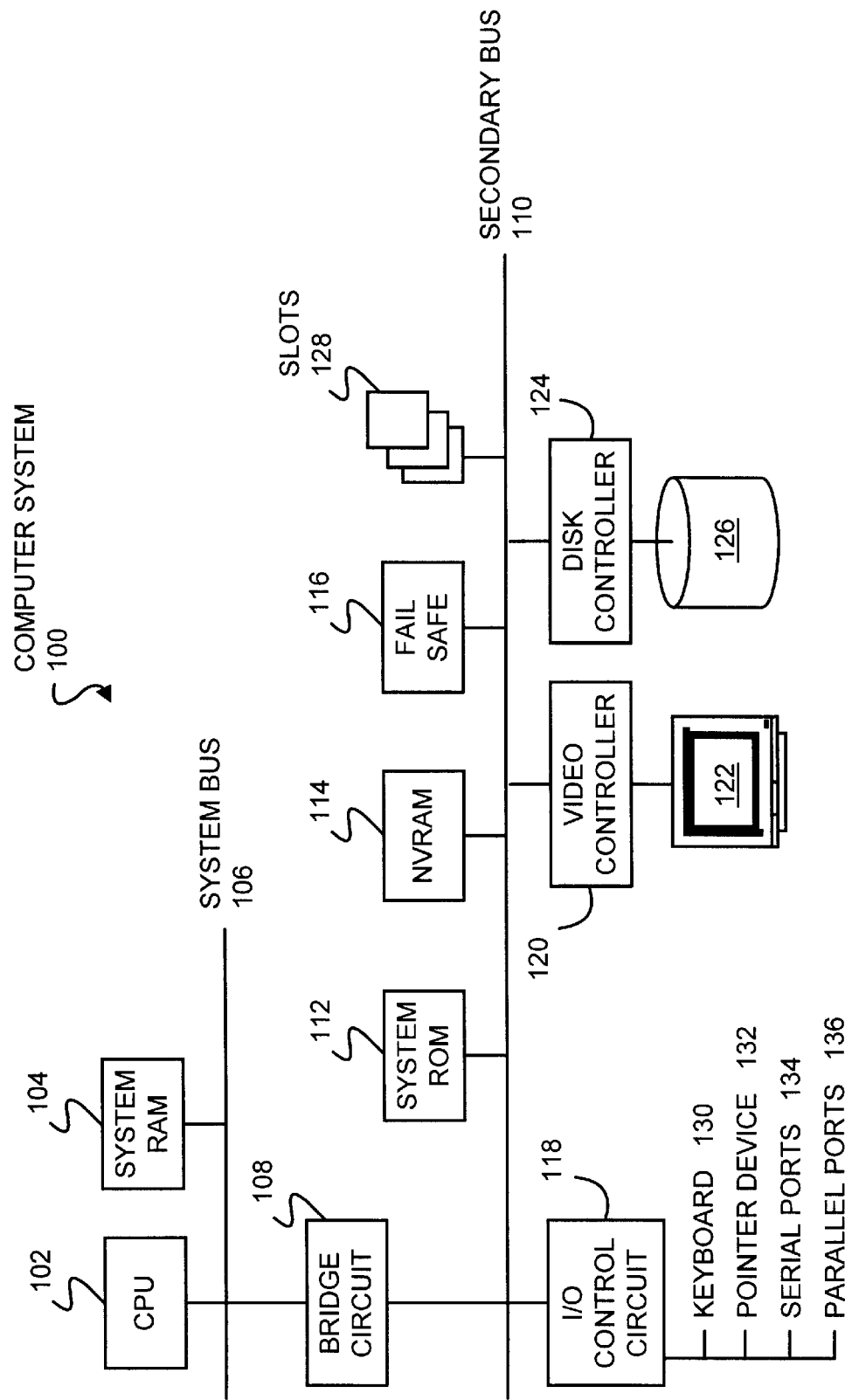
FIG. 1 shows a computer system.

Referring to FIG. 1, computer system 100 having fail safe power control capability includes host processor (CPU) 102 and random access memory (RAM) 104 coupled to system bus 106. Illustrative host processors 102 include the PENTIUM, PENTIUM PRO, PENTIUM-II, and 80×86 families of processors from Intel Corporation.

Bridge circuit 108 couples system bus 106 to secondary bus 110. Components coupled to secondary bus 110 can include: read only memory (ROM) 112; non-volatile RAM (NVRAM) 114; fail safe circuit 116; input-output (I/O) control circuit 118; video controller card 120 and associated display 122; disk controller card 124 and associated disks (one shown) 126; and one or more expansion slots 128.

Read only memory 112 provides storage for computer system 100's basic input-output system (BIOS) instructions and can be embodied in programmable versions of read only memory such as electrically erasable programmable ROM (EEPROM). Non-volatile RAM 114 can be a CMOS memory device or any other type of memory device capable of retaining stored information even after system 100 is powered down. Fail safe circuit 116 is a hardware component used to provide fail safe power control capability.

System ROM 112 and fail safe circuit 116 are described in more detail below. Input-output (I/O) control circuit 118 can provide an interface for user keyboard 130, pointer device 132, and serial 134 and parallel 136 ports.

Figure 2:
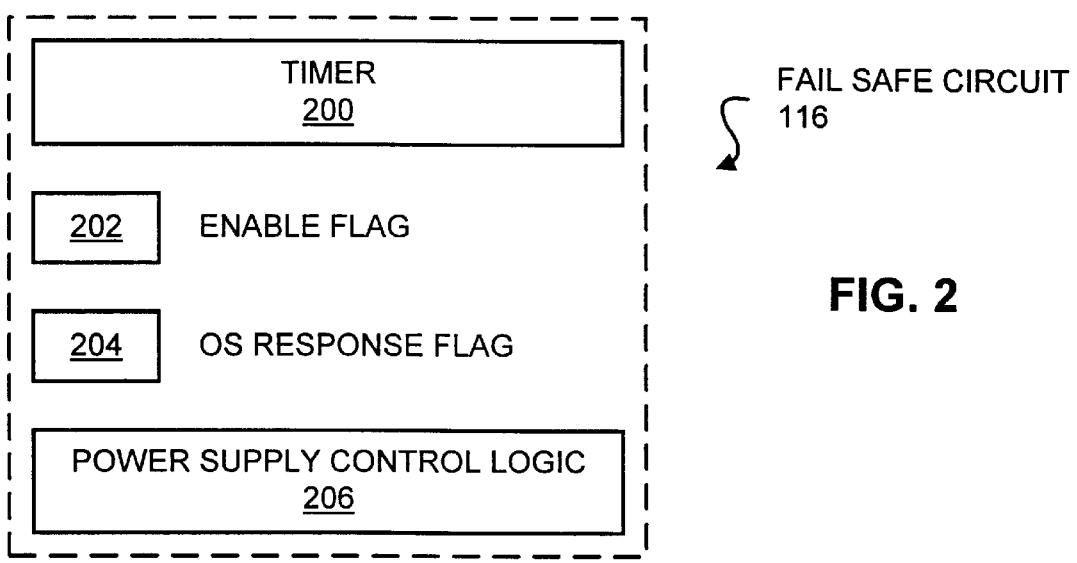
FIG. 2 shows a power control circuit of the computer system.

As shown in FIG. 2, fail safe circuit 116 includes timer 200, enable flag 202, operating system (OS) response flag 204, and power supply control logic 206. If enable flag 202 is not set, fail safe power control is not available to computer system 100. Operating system response flag 204 is used to indicate a "hung" condition (a state in which host processor 102 is not able to respond to interrupts or execute program instructions). Power supply control logic 206 provides hardware control to turn off computer system 100's power supply.

Figure 3:
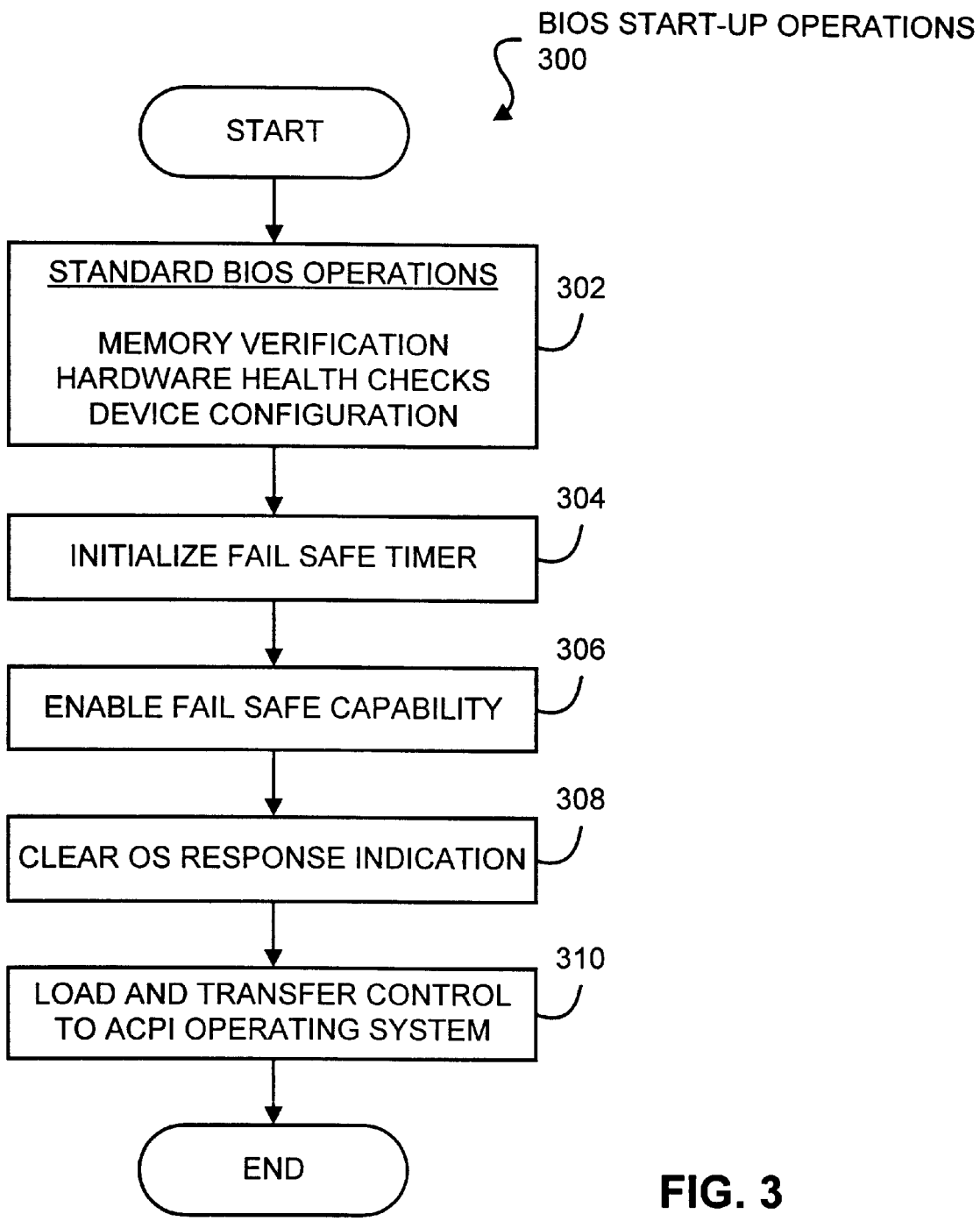
FIG. 3 shows basic input-output system (BIOS) actions during computer system start-up.

Referring now to FIG. 3, when computer system 100 is powered up or reset, host processor 102 begins executing BIOS start-up instructions 300 from system ROM 112. After performing standard BIOS actions such as verifying system RAM 104, performing hardware health checks, and configuring system devices (step 302), fail safe circuit 116 is prepared for operation. Specifically, fail safe timer 200 is initialized to a predetermined value (step 304), fail safe capability is enabled (step 306), and operating system response indication is cleared (step 308). The last BIOS action taken during start-up is to look for and transfer control to an ACPI operating system (step 310). This last step is known as "boot-strapping" the operating system.

In one embodiment, timer 200 is set to expire four seconds after being started, enable flag 202 is set to zero to indicate fail safe power control is operative, and OS response flag 204 is set to zero to indicate the operating system is operating normally. While any time period may be chosen, it is beneficial that the selected time be small enough that a user does not become impatient waiting for a hung system to power down, nor so short that the operating system does not have sufficient time to respond to a power button interrupt before being powered down by power supply control logic 206.

Because BIOS initializes fail safe circuit 116 after system device configuration (step 302), it is not necessary that fail safe circuit 116 reside on secondary bus 110 as shown in FIG. 1. Since fail safe circuit 116 is configured like any other device, it may reside at any location addressable by the BIOS during start-up operations 300.

As shown in FIG. 4, fail safe power control operations 400 are initiated when a user momentarily presses computer system 100's power button (step 402). Power button activation causes hardware to set OS response flag 204 to '1' (step 404), starts timer 200 (step 406), and generates a system control interrupt (SCI) to inform the operating system that the power button has been pressed (step 408).

If fail safe power control is not enabled (the 'no' prong of step 410; i.e., enable flag 202 set to '1'), fail safe processing terminates at step 412. If fail safe power control is enabled (the 'yes' prong of step 410), processing continues at step 414.

If timer 200 has expired (the 'yes' prong of step 414), power supply control logic 206 is commanded to turn computer system 100's power supply off (step 416). If timer 200 has not expired (the 'no' prong of step 414), processing continues at step 418.

If the operating system has indicated it received the SCI generated at step 408 (the 'yes' prong of step 418; i.e., set OS response flag 204 to '0'), timer 200 is turned off and reset (step 420). If the operating system has not indicated it received the SCI generated at step 408 (the 'no' prong of step 418), processing loops back to step 414.

As evidenced from the above description and FIG. 4, implementation of fail safe power control includes providing hardware for the system power button to: (1) set OS response flag 204 to '1'; (2) start timer 200; and (3) generate a SCI indicating the power button has been depressed. In addition, the operating system's ACPI driver must be modified to change the state of OS response flag 204 after it receives a power button SCI. Furthermore, the ACPI driver must ensure this action is taken before timer 200's specified period elapses, i.e., before timer 200 terminates.

The foregoing description is illustrative only and is not to be considered limiting. Other embodiments are within the scope of the claims. For example, system bus 106 and secondary bus 110 can be proprietary buses, peripheral component interface (PCI) buses, industry standard architecture (ISA) buses, extended industry standard architecture (EISA) buses, or combinations of one or more of these busses. Fail safe circuit 116 can be composed of discrete logic elements (e.g., hardware flip-flops and a 555 timer), or be incorporated within a specially designed application specific integrated circuit (ASIC). Steps of the invention may be performed by a computer processor executing instructions organized into a program module, or a specially designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. In addition, operating system manipulation of OS response flag 204 can be initiated by a modified ACPI driver (discussed above) or by an ACPI control method designed to perform the same task.

Each embodiment of the invention may provide one or more of several advantages. For example, the invention can automatically power down a computer system controlled by an advanced configuration and power interface (ACPI) operating system when the system host processor is hung.

What is claimed is:

1. A computer system comprising:
    a bus;
    a host processor operatively coupled to the bus;
    an input-output device operatively coupled to the bus;
    a power button detector circuit, operatively coupled to a power button of the computer system and adapted to detect when the power button has been activated;
    a processor state detector circuit, operatively coupled to the power button detection circuit and adapted to detect when the host processor is in a hung state in which the host processor cannot respond to the activation of the power button; and
    a power control circuit adapted to change the power state of the computer system when the power button has been activated and the processor state detector circuit detects the processor is in a hung state.

2. The computer system of claim 1 wherein the processor state detector circuit operates independently of an operating system.

3. The computer system of claim 1 wherein the power button detector circuit includes a status flag.

4. The computer system of claim 1 wherein the processor state detector circuit includes a timer.

5. The computer system of claim 1 wherein the input-output device comprises a pointing device.

6. The computer system of claim 1 further comprising an interrupt circuit adapted to transmit a system control interrupt to the host processor when the power button is activated.

7. The computer system of claim 6 wherein the interrupt circuit operates independently of an operating system.

8. The computer system of claim 6 further comprising an operating system executed by the host processor, wherein the operating system is adapted to communicate with the processor state detector circuit.

9. The computer system of claim 1 wherein the processor state detector circuit comprises an application specific integrated circuit.

10. The computer system of claim 1 wherein the power control circuit is adapted to change the power state of the computer system from a powered state to an unpowered state.

11. A computer system comprising:

a bus;

a host processor operatively coupled to the bus and executing an advanced configuration and power interface operating system;

an input-output device operatively coupled to the bus;

a power button detector circuit operatively coupled to a power button of the computer system and adapted to detect when the power button has been activated, the power button detector circuit having a status flag and operating independently of the operating system;

an interrupt circuit operatively coupled to the power button and adapted to transmit a system control interrupt to the host processor when the power button is activated, the interrupt circuit operating independently of the operating system;

a processor state detector circuit operatively coupled to the power button detection circuit and adapted to detect when the host processor is in a hung state in which the host processor cannot respond to the activation of the power button, the processor state detector circuit having a timer and operating independently of the operating system; and a power control circuit adapted to change the power state of the computer system from a powered state to an unpowered state when the power button has been activated and the processor state detector circuit detects the processor is in a hung state.

12. The computer system of claim 11, wherein the input-output device comprises a mass storage device.

13. The computer system of claim 11, wherein the processor state detector circuit comprises an application specific integrated circuit.

14. A computer system comprising:

a host processor;

an input-output device operatively coupled to the host processor;

a computer system power button; and power control circuitry which is operatively coupled to the power button and the host processor and adapted to detect when the power button has been activated, to detect when the processor is in a hung state in which the host processor cannot respond to the activation of the power button, and to power down the computer system when the power button is activated and the host processor is in a hung state.

15. The computer system of claim 14 wherein the power control circuitry operates independently of an operating system.

16. The computer system of claim 14 wherein the power control circuitry comprises a status flag and a timer.

17. The computer system of claim 14 wherein the power control circuitry comprises an application specific integrated circuit.

18. The computer system of claim 14 wherein the input-output device comprises a pointing device.

19. The computer system of claim 18 wherein the interrupt circuit operates independently of an operating system.

20. The computer system of claim 14 further comprising an interrupt circuit adapted to transmit a system control interrupt to the host processor when the power button is activated.

21. A control circuit, comprising:

a connecter configured to operatively couple to a host processor, a power button of a computer system, and to a computer system power supply;

a power button detector circuit operatively coupled to the connector and adapted to detect when the power button has been activated;

a state detector circuit operatively coupled to the power button detection circuit and to the connector and adapted to detect when the host processor is in a state in which the host processor cannot respond to the activation of the power button; and a power control circuit adapted to change the power state of the computer system when the power button has been activated and the state detector circuit detects the processor is in a state in which it cannot respond to the activation of the power button.

22. The control circuit of claim 21 wherein the power button detector circuit includes a status flag.

23. The control circuit of claim 21 wherein the state detector circuit includes a timer.

24. The control circuit of claim 21, wherein the power control circuit is adapted to change the power state of the computer system from a powered state to an unpowered state.

25. The control circuit of claim 21, wherein the state detector circuit comprises an application specific integrated circuit.

26. A power control method for a computer system, the computer system having a host processor, a power button, and a power supply, the method comprising:

receiving indication that the power button has been activated;

setting a flag;

initiating a timer; and turning the power supply off if the timer expires before the flag is cleared.

27. The method of claim 26 further comprising generating an interrupt to the host processor when the power button is activated.

28. The method of claim 27, wherein the interrupt is a system control interrupt.

29. The method of claim 27 wherein the host processor clears the flag in response to the interrupt and under control of an operating system level program.

30. The method of claim 29 wherein the operating system level program is an advanced configuration and power interface driver.

31. The method of claim 26 wherein the timer is configured to expire four seconds after being initiated.

32. A method for changing the power state of a computer system when a power button is activated by a user during an activation period, comprising:

after a period of time following activation of the power button, the period being longer than the activation period, determining if a host processor of the computer system is not able to respond to the activation of the power button; and if the host processor is not able to respond to the activation of the power button, changing the powered state without assistance of the host processor.

33. The method of claim 32 further comprising generating an interrupt to the host processor when the power button is activated.

34. The method of claim 33, wherein the interrupt is a system control interrupt.

35. The method of claim 32 wherein the period of time is four seconds.

36. A power control method for a computer system, the computer system having a host processor, a power button, and a power supply, the method comprising:

receiving indication that the power button has been activated;

generating a system control interrupt to the host processor when the power button is activated;

setting a flag;

initiating a timer configured to expire a predetermined time period after being initiated; and turning the power supply off if the timer expires before the flag is cleared.

37. The method of claim 36 wherein the timer is configured to expire four seconds after being initiated.

38. The method of claim 36 wherein the host processor, under control of an operating system level program, clears the flag in response to the system control interrupt.

* * * * *